(12) United States Patent
Fellinger

(10) Patent No.: US 8,088,885 B2
(45) Date of Patent: Jan. 3, 2012

(54) METHOD AND INSTALLATION FOR INCREASING THE INTRINSIC VISCOSITY OF POLYESTER MATERIAL BY SOLID PHASE POLYCONDENSATION

(76) Inventor: Markus Fellinger, Wilhering (AT)

( * ) Notice: Subject to any disclaimer, the term of this patent is extended or adjusted under 35 U.S.C. 154(b) by 380 days.

(21) Appl. No.: 11/917,365

(22) PCT Filed: Jun. 13, 2006

(86) PCT No.: PCT/AT2006/000237
§ 371 (c)(1),
(2), (4) Date: Dec. 13, 2007

(87) PCT Pub. No.: WO2006/133469
PCT Pub. Date: Dec. 21, 2006

(65) Prior Publication Data
US 2009/0292101 A1 Nov. 26, 2009

(30) Foreign Application Priority Data
Jun. 14, 2005 (AT) ................. A 1000/2005

(51) Int. Cl.
*C08F 6/00* (2006.01)
(52) U.S. Cl. ........ 528/503; 528/271; 528/272; 528/302; 528/308.2; 528/308.3; 528/480; 528/502 R; 422/129; 422/131; 422/139; 422/245.1
(58) Field of Classification Search .................. 528/271, 528/272, 302, 308.1, 308.2, 308.3, 480, 502 R, 528/503; 422/129, 131, 138, 139, 245.1
See application file for complete search history.

(56) References Cited

U.S. PATENT DOCUMENTS
4,161,578 A * 7/1979 Herron ................. 528/308.5
5,817,747 A * 10/1998 Giordano et al. ............. 528/503

FOREIGN PATENT DOCUMENTS
| DE | 197 10 098 | 9/1998 |
|---|---|---|
| DE | 100 54 240 | 5/2002 |
| EP | 0 836 921 | 4/1998 |
| WO | 2004/029130 | 4/2004 |

* cited by examiner

*Primary Examiner* — James J Seidleck
*Assistant Examiner* — Frances Tischler
(74) *Attorney, Agent, or Firm* — Workman Nydegger

(57) ABSTRACT

An installation for increasing the intrinsic viscosity of a polyester material by solid phase polycondensation (SSP) comprises a heatable reaction container (2, 2') in which the polyester material (P) can be left to reside at a predetermined thermal treatment temperature for a predetermined residence time until it has reached a desired intrinsic viscosity, and a cooling container (6, 6') arranged downstream of the reaction container, the cooling container (6, 6') being designed for cooling the polyester material discharged from the reaction container to a first cooling temperature which is lower than the reaction temperature. Downstream of the cooling container (6, 6'), a polyester material separator (7) is arranged which is designed for diverting the polyester material flow to a polyester material processing machine (8) and/or to an intermediate storage container (10).

19 Claims, 2 Drawing Sheets

METHOD AND INSTALLATION FOR INCREASING THE INTRINSIC VISCOSITY OF POLYESTER MATERIAL BY SOLID PHASE POLYCONDENSATION

The invention concerns a method and an installation for increasing the intrinsic viscosity of a polyester material by solid phase polycondensation, wherein the polyester material is introduced into a reaction container and is left to reside in said reaction container at a predetermined thermal treatment temperature for a predetermined residence time until the polyester material exhibits a desired intrinsic viscosity, and subsequently the polyester material is delivered into a cooling container where it is cooled down to a temperature below a first cooling temperature which is lower than the reaction temperature.

For the production of high-molecular polyesters such as, for example, PET and PEN, polyester properties which are unique among synthetic materials are utilized, according to which a polycondensation of polyester molecules occurs and hence the viscosity of the polyester is increased if the polyester is left to reside at high temperatures. The polyester is left to reside under vacuum or inert gas in order to prevent oxidative degradation. This obtainment of high-molecular polyesters from a low-molecular polyester starting material is usually brought about by melt polycondensation (MPPC) or solid phase polycondensation (SSP) or a combination of both methods.

During the melt polycondensation, a polyester melt is processed under a high vacuum of about 1 mbar at temperatures of from about 270° C. to 300° C. for approx. 30 minutes to 5 hours. This involves the disadvantage that, due to the high processing temperatures, the initially illustrated oxidative degradation process of the polyester takes place, which results in yellow colouring and counteracts the polycondensation of the polyester. The intrinsic viscosity values achievable by melt polycondensation amount to approx. 0.6 IV (=Intrinsic Viscosity).

During the solid phase polycondensation, the polyester melt is usually extruded through several dies, and the plastic strands thus formed are subsequently cooled in a water bath. After solidification, the plastic strands are granulated, i.e., they are cut into pellets. Because of the rapid cooling, the polyester is provided in an amorphous state. This is important because polyester materials which originally were transparent remain transparent in the amorphous state, whereas polyester that is cooled slowly assumes a crystalline state in which the material which originally was transparent turns white. For further processing, the polyester granules must be reheated with an agglutination of granular bodies in the crystallization temperature range (80-120° C.). Therefore, the granules are first supplied to a so-called crystallizer in which they are brought to a temperature above the crystallization temperature under vigorous stirring in order to recover the flowability of the granular bodies for the further treatment, which is of utmost importance for the transport and the drying in a container without a stirring device. Moreover, the granules absorb less moisture in the crystalline form, thus permitting shorter residence times during drying. Thereupon, the granules are supplied to a solid phase polycondensation container, also referred to as an SSP (Solid State Polycondensation) reactor or a heat treatment container, in order to increase the intrinsic viscosity, are heated therein to approx. 190 to 250° C. and, subsequently, are left in the SSP reactor under these conditions for about 1-40 hours until the desired intrinsic viscosity is achieved.

The methods for SSP can basically be divided into two groups, namely a continuous SSP, as described, e.g., in DE 100 54 240, wherein normally nitrogen is used as the inert gas and, at the same time, serves as a heat-transfer medium and a transport medium for separation products isolated from the polycondensation, and a discontinuous SSP, as described in DE 197 10 098, wherein the synthetic material is filled into a tumble drier, is heated under vacuum to a temperature above the reaction temperature, is left to reside at this temperature until the desired intrinsic viscosity is achieved, and subsequently is cooled down to a temperature below the reaction temperature again in the same drum. A semi-continuous SSP method is furthermore disclosed in WO 2004/029130 A1. It should be mentioned that the continuous and semi-continuous SSP methods, respectively, described in the aforesaid publications are only suitable for increasing the intrinsic viscosity of plastic granules in such a manner in which the plastic granules are cooled in the SSP reactor after having reached the desired intrinsic viscosity by remaining in the SSP reactor at temperatures above the reaction temperature and are stored therein in the cooled state.

Newer methods allow the solid phase polycondensation step to be eliminated by generating the desired intrinsic viscosity directly by melt polycondensation (MPPC), using specific designs of the installation and longer residence times of the polyester material. However, this method of increasing the intrinsic viscosity is disadvantageous particularly for the preform production since, by omitting the SSP step, a reduction of acetaldehyde, which normally takes place in the solid phase, is also omitted in the polyester. However, said reduction of acetaldehyde is essential for some applications of polyester in the field of food production so that, if the intrinsic viscosity is increased by MPPC, the addition of expensive additives is necessary in order to achieve the desired reduction of acetaldehyde.

Following their treatment for increasing the intrinsic viscosity, high-molecular polyesters such as PET, PEN, PA or PC are employed in numerous fields of application, for example, in so-called preforms for the production of plastic bottles, furthermore for straps, thermoformed films and sheets etc. The treatment of the polyester material for increasing the intrinsic viscosity takes place in refineries according to one of the above described methods, subsequently, the treated plastic granules are cooled down to ambient temperature, filled into transport containers and delivered, for example, to a preform plant. Since the polyester granules have bound water during the storage and transport due to their hygroscopic properties, the high-molecular polyester granules must first be heated in a drier from the cold state to approx. 160-180° C. in the preform plant in order to remove the bound water before they can be processed into preforms in injection moulding machines. For drying the granules, residence times of 6 hours or more in the drier are required, otherwise, the result would be large viscosity losses of the polyester. This necessary drying step limits the processing speed of the plastic granules and necessitates a high energy input, wherein, considering the total energy balance, the cooling of the polyester granules in the refinery and their later reheating for drying in the processing plant are extremely disadvantageous.

In order to improve the total energy balance, it has already been suggested that the polyester granules should not be subjected to an SSP treatment already in the refinery when they are being produced but that said SSP treatment of the polyester granules should be carried out only in the processing plant immediately before said granules are processed in a processing machine such as in an injection moulding machine. For this purpose, the granules produced in the refinery, which typically have an intrinsic viscosity of approx. 0.64 IV, are conveyed into an SSP reactor arranged upstream of the processing machine and are subjected therein to the SSP treatment for raising the intrinsic viscosity to the desired values, a drying of the material taking place simultaneously and the acetaldehyde in the granules being reduced to below 1 ppm. For the preform production, a cheap raw material directly from the refinery, which has not been treated by SSP, can thus be used.

However, the previous suggestions regarding the implementation of the SSP treatment of a synthetic material immediately before said material is processed in injection moulding machines etc. requires that the continuous operation be maintained after the start-up of the installation, since otherwise it would not be possible to control the reactions of the synthetic material occurring in the installation, which might lead to an unsteady quality of the synthetic material and/or to the occurrence of harmful substances; the latter is unacceptable for the manufacture of products for the food industry (PET bottles etc.). In practice, however, a uniform continuous operation cannot be guaranteed in the daily operation of plastic-processing plants, be it due to malfunctions or due to necessary retrofitting of machines and tools which require a temporary standstill of the machines or at least a substantially reduced operating speed.

Therefore, it is the object of the present invention to provide a method and a device of the initially defined kind by means of which the above-described disadvantages of the prior art are mitigated or even eliminated. In particular, it is an object of the present invention to provide a method and an installation for increasing the intrinsic viscosity of a polyester material by solid phase polycondensation, wherein, instead of a drier, an SSP reactor is arranged directly upstream of a plastic-processing machine such as an injection moulding or extrusion machine, whereby, however, a varying flow rate of the synthetic material or a standstill of the plastic-processing machine will not lead to an unsteady quality of the supplied synthetic material, or long starting times and/or high material losses as a result of stopping and restarting the SSP reactor will not have to be put up with.

The present invention solves the above stated problem by providing a method of increasing the intrinsic viscosity of a polyester material having the characterizing features of claim 1 as well as by providing an installation for increasing the intrinsic viscosity of a polyester material as defined in claim 13. Advantageous embodiments of the invention are set forth in the dependent claims. The reaction temperature is the temperature at which the increase in the intrinsic viscosity of the polyester starts to be measurable. For PET, it is, for example, 180° C. The measurement of the increase in the intrinsic viscosity can be performed according to DIN standard DIN 53 728 "Determination of the Viscosity Number of Polyethylene Terephthalate (PETP) or Polybutylene Terephthalate (PBTP) in a Diluted Solution".

According to the invention, the increase in the intrinsic viscosity of a polyester material is effected by solid phase polycondensation (SSP) in a heatable reaction container, with the reaction container being arranged upstream of one or several plastic-processing machines. By using the reaction container (SSP reactor) ahead of the plastic-processing machines (injection moulding machine, extruder for films, straps, monofilaments or sheets, etc.), the raw material costs can be reduced by approx. 10-20% compared to a delivery of a polyester material that has been pretreated by SSP in a refinery, since drying of the delivered material is not required. The polyester material is introduced into the reaction container and is left there for a predetermined residence time at a predetermined thermal treatment temperature which is at least the reaction temperature of the polyester material until it has reached a desired intrinsic viscosity. Subsequently, it is conveyed into a cooling container arranged downstream of the reaction container and is cooled down to a first cooling temperature in the cooling container, the first cooling temperature being lower than the reaction temperature of the polyester material, whereby a further increase in the intrinsic viscosity of the polyester material is stopped. According to the invention, the cooled polyester material is conveyed from the cooling container to a polyester material separator arranged downstream of the cooling container and designed for diverting the polyester material flow to a polyester material processing machine and/or to an intermediate storage container. In the normal operation of the production, the polyester material separator is set such that the cooled polyester material is supplied to the at least one processing machine. In the event of a malfunction or a breakdown of a processing machine or if retrofitting of one or several processing machines becomes necessary, the polyester material separator is switched such that at least a partial stream of the synthetic material is branched off toward an intermediate storage container, in case of a total stop of the processing machines, the entire synthetic material flow is conveyed to the intermediate storage container. The intermediate storage container can be built in any size in order to ensure that sufficient intermediate storage capacity is provided also in the event of lengthy machine down-times in order to accommodate the SSP treated polyester material which meanwhile has accumulated. The essential advantage of the invention in comparison to the prior art is that, even in the event of a temporary stoppage of the processing machines or in case of a reduced processing speed of the polyester material, it is not necessary to intervene with the SSP process, but said process can proceed further, and, also, it is in particular not necessary to stop the SSP process. It is understood how important this is if one considers that between 1 and approx. 10 tons of polyester granules or ground stock above the reaction temperature of 180° C. or more are usually located in the SSP reactor. With regard to process engineering, it is hardly accomplishable to uniformly cool such a large amount of synthetic material in the SSP reactor in order to shut down the SSP process and to subsequently reheat said amount of synthetic material, thereby ensuring a uniform residence time above the reaction temperature and hence a uniform intrinsic viscosity for the entire synthetic material.

By using the SSP reactor directly ahead of the processing machine, the viscosity of the synthetic material in the installation according to the invention can be individually adjusted to the processing step in the processing machine and, respectively, to the product manufactured therewith, and further process optimizations with regard to cycle times can thus be performed. For example, a synthetic material as a starting product for preforms for the production of plastic bottles for low-carbonated mineral water requires an intrinsic viscosity of only 0.72 IV because of the lower mechanical strength properties of the bottles, CSD bottles require intrinsic viscosity values of the raw material of 0.82 IV due to the higher pressure in the bottle. Since, in the installation according to the invention, the intrinsic viscosity of the polyester material can be individually adjusted directly ahead of the processing machine, the same raw material can always be bought, which simplifies logistics (for example, the cleaning of raw material hoppers, which is necessary when the raw material is replaced, can be omitted) and permits lower purchase prices because of larger purchase order quantities. Since, furthermore, following the SSP treatment of the polyester material, long-term storage of the material is not required but the material is processed immediately, the acetaldehyde content in the material cannot increase as it happens in a conventional production because of the storage and transport. Thus, according to the invention, neither expensive additives nor specific after-treatment processes for reducing the acetaldehyde content are required but, according to the invention, a reduction of the acetaldehyde content occurs in the SSP reactor directly ahead of the processing machine. Because of the thermal treatment of the polyester material and a long residence time of typically more than 6 h in the reaction container, it can be assumed that the values prescribed by the FDA are achieved, since the diffusion process in the reaction container brings about a significant reduction of possible impurities in the polyester material. This allows applications such as the direct extrusion of films for food contact and injection moulding applications for the field of food production, independently of an upstream washing process of the polyester material.

In one embodiment of the invention it is provided that the polyester material, when subsequently it is to be delivered into the intermediate storage container, is cooled down to a second cooling temperature in the cooling container, which second cooling temperature is lower than the first cooling temperature. The second cooling temperature should amount to not more than 160° C., preferably not more than 140° C., depending on the polyester material, in some cases it should be distinctly lower (e.g., not more than 80° C.), since PET, for example, turns yellow when it is stored at a temperature above 160° C. The control of the cooling container is suitably coupled to the position of the polyester material separator.

In one embodiment of the invention which is particularly suitable for small and medium-sized installations, the cooling container is designed so as to be evacuatable and is preferably operated under a vacuum of between 0.1 and 10 mbar.

In an alternative embodiment of the invention, which, due to a better thermal energy transfer, results in faster cooling of the synthetic material, the polyester material is cooled by dry air or an inert gas in the cooling container. However, with this embodiment, the effort pertaining to the apparatus is larger, particularly if an inert gas is used which must be conducted in a closed circuit and purified.

The cooling container of the installation according to the invention can act as a discharge container for the reaction container, for which purpose it is designed as a lock container which comprises vacuum-tight shut-off devices on its polyester material inlet and its polyester material outlet. The cooled polyester material is thereby discharged in batches.

In order to increase the speed of cooling of the polyester material in the cooling container, in an advantageous embodiment of the installation according to the invention, the cooling container is provided with a stirring device.

In a preferred embodiment of the invention, the polyester material is heated at least to the reaction temperature already before being introduced into the reaction container. This can occur in smallish amounts in a preheating container arranged upstream of the reaction container, whereby the heated material is delivered in batches from the preheating container to the reaction container.

It must be noted that the thermal treatment temperature in the reaction container is indeed selected depending on the material, for most materials, however, it should be at least 180° C.

In one embodiment of the invention which, due to its simple design, is particularly suitable for small and medium-sized installations, the reaction container can be kept under a vacuum preferably of between 0.1 and 10 mbar. Alternatively, a heat-transfer medium, preferably an inert gas or dry air, is passed through the reaction container. However, this design involves a significantly higher effort pertaining to the apparatus which pays off only in large-scale plants.

With reference to the drawings, the invention is now illustrated in further detail based on two exemplary embodiments to which the invention is not limited, however.

Figure 1:
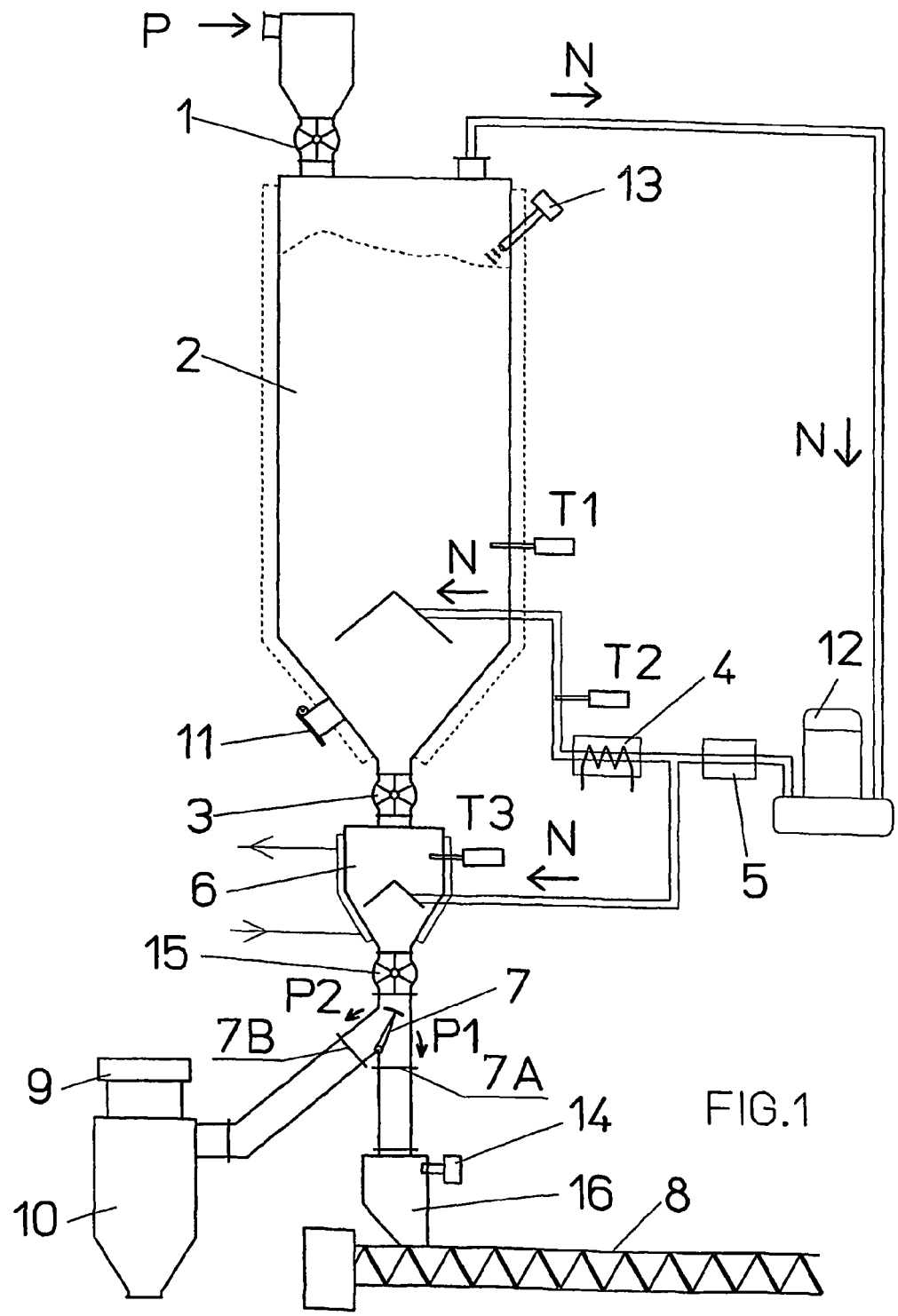
FIG. 1 shows in a schematic connection diagram a first embodiment of an installation according to the invention for increasing the intrinsic viscosity of a polyester material.

First referring to FIG. 1, a first embodiment of the installation according to the invention for increasing the intrinsic viscosity of a polyester material with a reaction container heated with dry air or an inert gas is illustrated. A polyester material P, which comprises PET, PA, PC etc. and is provided as granules or as a ground stock made of bottles, preforms etc., is supplied in a crystalline form, preferably after having been preheated, via a shut-off device 1, illustrated as a rotary valve, to an SSP reaction container 2, where it is heated to a thermal treatment temperature which is at least as high as the reaction temperature of the polyester material to be treated and preferably higher while being lower than the melting temperature of the polyester material, using a heat-transfer medium N, e.g., an inert gas such as nitrogen or dry air. The reaction temperature is the temperature at which the increase in the intrinsic viscosity of the polyester material starts to be measurable. The thermal treatment temperature is adjusted depending on the supplied polyester material, however, generally it amounts to at least 180° C., preferably to about 220°. The temperature inside the reaction container is measured using a temperature sensor T1. The heat-transfer medium N is supplied to the reaction container 2 in the lower region thereof and is sucked off in the upper region of the reaction container 2 via a fan (not illustrated) or a side channel blower 12 and is freed from included impurities and moisture, respectively, via a gas scrubbing and gas drying means 5, respectively. Subsequently, the heat-transfer medium N is heated to the thermal treatment temperature using a heater 4 and is again supplied to the reaction container 2, the temperature of the heat-transfer medium N being measured by a temperature sensor T2 in the supply pipe to the reaction container 2. Reference numeral 13 indicates a level sensor for the reaction container 2.

In the course of the residence time of the polyester material in the SSP reaction container 2, a solid phase polycondensation of the polyester material occurs, leading to an increase in its intrinsic viscosity, whereby coproducts formed thereby or present therein, respectively, are sucked off with the flow of heat-transfer medium. In the lower region of the reaction container 2, an opening 11 for sample taking is provided in order to determine the degree of polymerization of the synthetic material.

Via a shut-off device 3 designed as a lock wheel, the polyester is conveyed from the reaction container 2 into a cooling container 6 following its SSP treatment. At the output of the cooling container 6, a further shut-off device 15 is arranged, followed by a polyester material separator 7 comprising two outputs 7A, 7B, wherein output 7A is connected with a pipeline to a polyester material processing machine 8, here designed as a screw extruder, and output 7B is connected with a pipeline to an intermediate storage container 10. Depending on the position, the polyester material separator 7 divides the polyester material flow passing through the shut-off device 15 into a material flow P1 leading to the processing machine 8 or into a material flow P2 leading to the intermediate storage container 10, with intermediate positions, i.e., the diversion of partial streams into both paths, being possible as well.

Depending on whether the downstream processing machine 8 requires material, which is measured by a level sensor 14 at a feeding hopper 16 of the processing machine 8, the polyester material in the cooling container 6 is cooled down either to a first cooling temperature which is lower than the reaction temperature of the polyester material in the reaction container 2, e.g., below 180° C. for PET, or to a second cooling temperature which is lower than the first cooling temperature, whereby the second cooling temperature is supposed to be below a temperature at which the polyester material turns yellow during storage, e.g., below 160° C. for PET. It is understood that the second cooling temperature can also be significantly lower, whereby it can be selected, for example, from a range of between 70 and 120° C. Another criterion for the selection of the second cooling temperature is the temperature resistance of the intermediate storage container 10. The first cooling temperature can, for example, be adjusted to a range of between 140 and 179° C., and the second cooling temperature can be adjusted to between 70 and 139° C. The polyester material is always cooled down to the first cooling temperature if the polyester material is supposed to be supplied to the processing machine 8. In that case, cooling to a temperature lower than the reaction temperature is indeed required in order to stop the process of increasing the intrinsic viscosity, however, for reasons of energy saving, cooling as minor as possible is desired on the other hand, since, in the processing machine 8, the temperature of the synthetic material is again raised to the melting temperature and a smaller energy input is thus required if the synthetic material is introduced into the processing machine already at a higher temperature. The polyester material is cooled down to the second (lower) cooling temperature if the polyester material is to be delivered to the intermediate storage 10. In that case it is to be ensured that a yellow colouring of the polyester material can no longer occur, i.e., the second cooling temperature is chosen such that it is, e.g., below 160° C. for PET, or, respectively, it is chosen to be correspondingly lower in order to allow trouble-free storage of the polyester material. The adjustment of the cooling container 6 with respect to which of the two cooling temperatures the polyester material therein is cooled down to can be effected either depending on the signals of the level sensor 14 or depending on the position of the polyester material separator 7. If the level sensor 14 indicates that the feeding hopper 16 is full, the polyester material separator 7 is switched such that the stream of polyester material P2 flows into the intermediate storage container 10, the polyester material in the material flow P2 having previously already been cooled down to the second cooling temperature. The material flow P2 can be conveyed through a conveying element such as, e.g., by vacuum conveyance 9. If the processing machine 8 requires new polyester material, the polyester material separator 7 is switched in order to conduct the material flow P1 to the processing machine 8, the cooling of the material down to the first cooling temperature being adjusted simultaneously in the cooling container.

Figure 2:
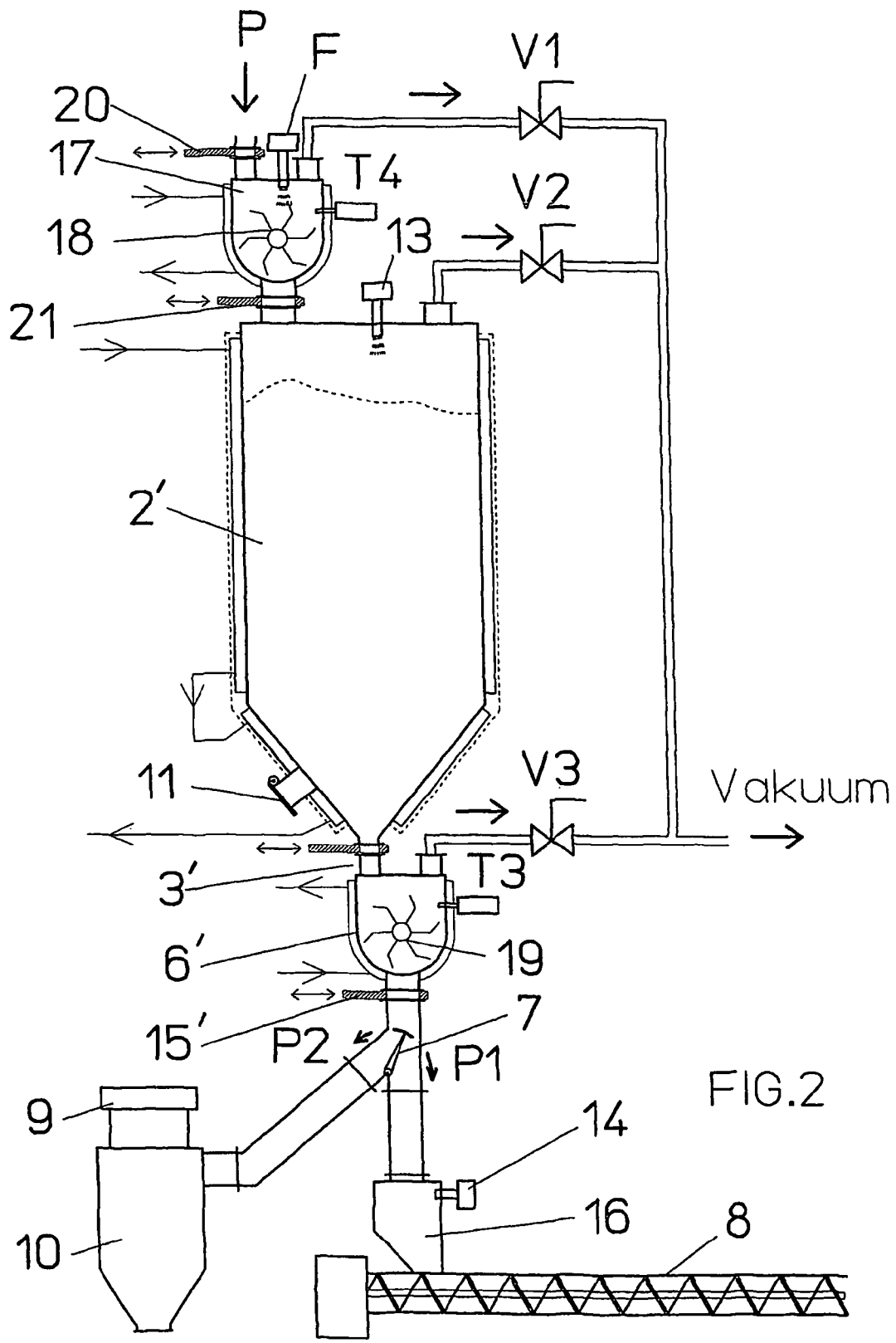
FIG. 2 shows in a schematic connection diagram a second embodiment of an installation according to the invention for increasing the intrinsic viscosity of a polyester material.

Referring to FIG. 2, a second embodiment of an installation according to the invention for increasing the intrinsic viscosity of a polyester material is now illustrated which differs from the first embodiment particularly in that the SSP reaction container 2' is operated under vacuum. Components of the second embodiment corresponding to those of the first embodiment are indicated by equal reference numerals and, in case of structural differences but equal functions, are additionally provided with apostrophes.

Via vacuum conveyance, the crystalline, preferably preheated polyester material P is introduced in batches into an evacuatable preheating container 17 at the same time serving as a vacuum lock for the SSP reaction container 2'. For this purpose, the preheating container 17 is provided at its input with a shut-off device 20 in the shape of a vacuum-tight slide and is also provided at its output with a vacuum-tight shut-off device 21. For faster heating of the polyester to the reaction temperature, the preheating container is furthermore provided with a stirring device 18. The temperature in the preheating container is measured by a temperature sensor T4. After the introduction of the polyester material P, the preheating container 17 is evacuated and the polyester material is heated to the reaction temperature or to a higher temperature, in any case, however, to a temperature below the melting temperature, and subsequently is delivered to the SSP reaction container 2' by opening the shut-off device 21. Reference numeral 13 indicates a level sensor for the reaction container 2'. After the desired residence time in the reaction container 2' (i.e., after the desired IV has been reached), the polyester material is delivered in batches via a shut-off device 3', here designed as a slide, into a cooling container 6' in which the polyester material is cooled down to a first cooling temperature which is lower than the reaction temperature. The cooling container 6' has a stirring device 19 for accelerating the cooling process. Through a shut-off device 15' shaped like a slide, the polyester material is subsequently delivered to the polyester material separator 7 which is switched such that the polyester material flow P1 is supplied to a feeding hopper 16 of a processing machine 8. If the level sensor 14 at the feeding hopper 16 signals "full", the shut-off device 15' is closed and the polyester material separator 7 is switched so that a transport path between the cooling container 6' and the intermediate storage container 10 is opened. The remaining polyester material located in the cooling container 6' is cooled down to a second cooling temperature which is lower than the first cooling temperature in order to prevent agglutination of the material and oxidation thereof. After the second cooling temperature has been reached, which is measured by the temperature sensor T3, the shut-off device 15' is reopened and the polyester material flow P2 is delivered into the intermediate storage container 10 by a vacuum conveying means 9. Although the processing machine is unable to accommodate any polyester material, be it due to a malfunction or due to a required standstill as a result of retrofitting, the SSP process in the reaction container 2' can proceed further in an unchanged manner, i.e., after expiry of the desired residence time, the polyester material is delivered in batches from the SSP reaction container 2' to the cooling container 6', is cooled down there to the second cooling temperature and is then delivered to the intermediate storage container 10.

The preheating container 17, the reaction container 2' and the cooling container 6' are connected via vacuum ducts to a vacuum source (not illustrated) so that a vacuum of between 0.1 and 10 mbar can be generated in said containers. The evacuation of the individual containers is controlled via valves V1, V2, V3 in the vacuum ducts.

Furthermore, it should be mentioned that, likewise, embodiments of the installation according to the invention for increasing the intrinsic viscosity of a polyester material by SSP are provided which are made up of a combination of parts of the first and second embodiments illustrated above. Thus, in a further equipment configuration, the polyester material to be supplied is first heated to a temperature slightly below the reaction temperature, e.g., to approx. 170° C., for example in a spirally wound supply pipeline, using hot or dry air, and subsequently is conveyed into a vacuum-tight preheating container which has a relatively small capacity of e.g., 100 kg.

Thereupon, the polyester material is heated under dry air to a thermal treatment temperature of, e.g., approx. 200° C., in the preheating container, a vacuum lock between the supply pipeline and the preheating container is then closed, the preheating container is evacuated, and 100 kg of polyester material is delivered into an SSP container having a significantly larger capacity, where an SSP treatment with a defined residence time takes place at the thermal treatment temperature. After expiry of the residence time, the polyester material is delivered in batches into a cooling container and is cooled down therein to the first or second cooling temperature, as described above.

What is claimed is:

1. A method for increasing the intrinsic viscosity of a polyester material by solid phase polycondensation, comprising:
    introducing a polyester material into a reaction container and permitting it to reside in the reaction container at a predetermined thermal treatment temperature, which is at least as high as a reaction temperature of the polyester material, from which an increase in the intrinsic viscosity is measurable, and for a predetermined residence time until the polyester material exhibits a desired intrinsic viscosity;
    delivering the polyester material from the reaction container into a single cooling container so as to selectively cool the polyester material to either a first cooling temperature that is lower than the reaction temperature if the polyester material is delivered directly from the cooling container to a polyester material processing machine or a second cooling temperature that is lower than the first cooling temperature if the polyester material is diverted to an intermediate storage container instead of being delivered directly to the polyester material processing machine;
    during a first period of operation, delivering the polyester material directly from the single cooling container to a polyester material processing machine, the polyester material being cooled within the single cooling container to the first cooling temperature prior to being delivered to the polyester material processing machine; and
    during a second period of operation, diverting the polyester material to an intermediate storage container, the polyester material being cooled in the single cooling container to the second cooling temperature prior to being diverted to the intermediate storage container.

2. A method according to claim 1, wherein the polyester material in the cooling container is cooled under vacuum.

3. A method according to claim 1, wherein the polyester material in the cooling container is cooled using a heat-transfer medium comprising dry air or an inert gas.

4. A method according to claim 3, wherein the cooling container is designed as an evacuatable lock container which comprises vacuum-tight shut-off devices on its polyester material inlet and its polyester material outlet.

5. A method according to claim 1, wherein the cooling of the polyester material in the cooling container is effected under stirring.

6. A method according to claim 1, wherein the polyester material is heated to a thermal treatment temperature before being introduced into the reaction container.

7. A method according to claim 6, wherein the polyester material is heated in a preheating container and delivered in batches from the preheating container to the reaction container.

8. A method according to claim 1, wherein the thermal treatment temperature is at least 180° C.

9. A method according to claim 1, wherein the first cooling temperature is between 140° C. and 179° C.

10. A method according to claim 1, wherein the reaction container is kept under a vacuum of between 0.1 and 10 mbar.

11. A method according to claim 1, wherein a heat-transfer medium comprising an inert gas or dry air is passed through the reaction container.

12. A method according to claim 1, wherein the second cooling temperature is 160° C. or less.

13. A method according to claim 12, wherein the second cooling temperature is 140° C. or less.

14. A method according to claim 1, wherein the second cooling temperature is between 70° C. and 139° C.

15. A method according to claim 1, wherein the cooled polyester is selectively delivered by means of a polyester material separator in a divertible manner to the polyester material processing machine and/or to the intermediate storage container.

16. A method for increasing the intrinsic viscosity of a polyester material by solid phase polycondensation, comprising:
    introducing a polyester material into a reaction container and permitting it to reside in the reaction container at a thermal treatment temperature of at least 180° C., from which an increase in the intrinsic viscosity is measurable, and for a predetermined residence time until the polyester material exhibits a desired intrinsic viscosity;
    delivering the polyester material from the reaction container into a single cooling container that cools under vacuum or using a heat-transfer medium comprising dry air or an inert gas so as to selectively cool the polyester material to either a first cooling temperature in a range of 140-170° C. if the polyester material is delivered directly from the cooling container to a polyester material processing machine or a second cooling temperature in a range of 70-139° C. if the polyester material is diverted to an intermediate storage container instead of being delivered directly to the polyester material processing machine;
    during a first period of operation, delivering the polyester material directly from the single cooling container to a polyester material processing machine, the polyester material being cooled within the single cooling container to the first cooling temperature prior to being delivered to the polyester material processing machine; and
    during a second period of operation, diverting the polyester material to an intermediate storage container, the polyester material being cooled in the single cooling container to the second cooling temperature prior to being diverted to the intermediate storage container.

17. A method according to claim 16, wherein the polyester material in the cooling container is cooled under vacuum.

18. A method according to claim 16, wherein the cooling of the polyester material in the cooling container is effected under stirring.

19. A method according to claim 16, further comprising removing polyester material from the intermediate storage container and introducing it into the polyester material processing machine.

* * * * *